Oct. 8, 1946.　　　　C. V. BRADY ET AL　　　　2,409,100
BAG STRUCTURE AND PROCESS OF MANUFACTURE
Filed Nov. 1, 1943　　　3 Sheets-Sheet 1
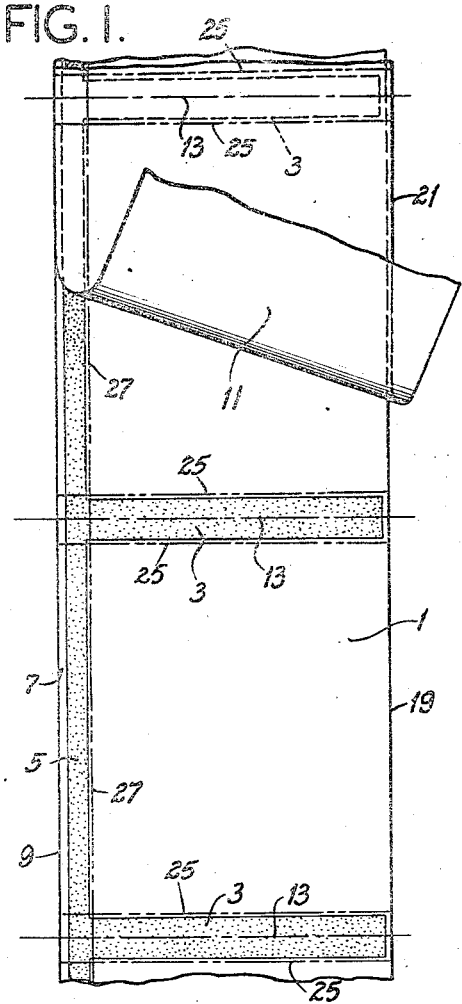
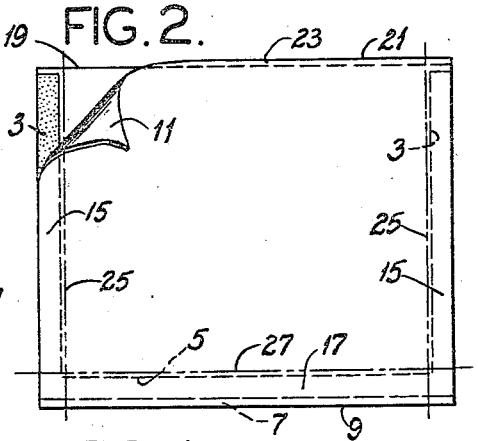
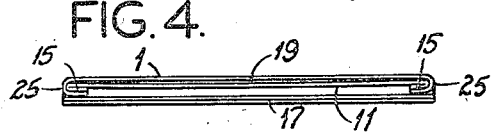
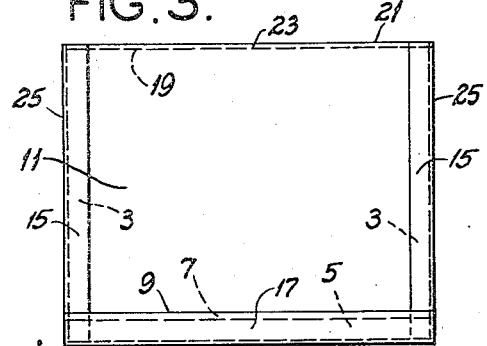
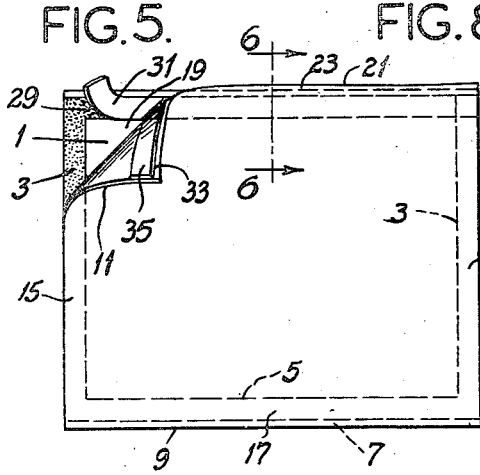
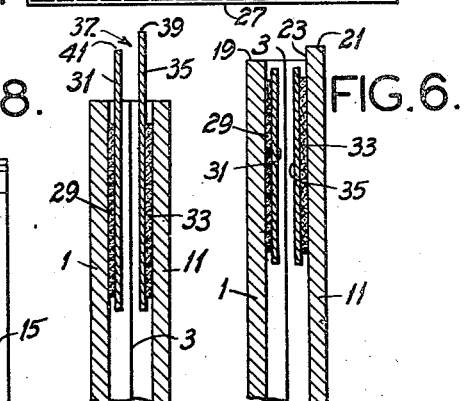
Charles V. Brady,
Russell J. Williams,
Inventors.
Haynes and Koenig,
Attorneys.

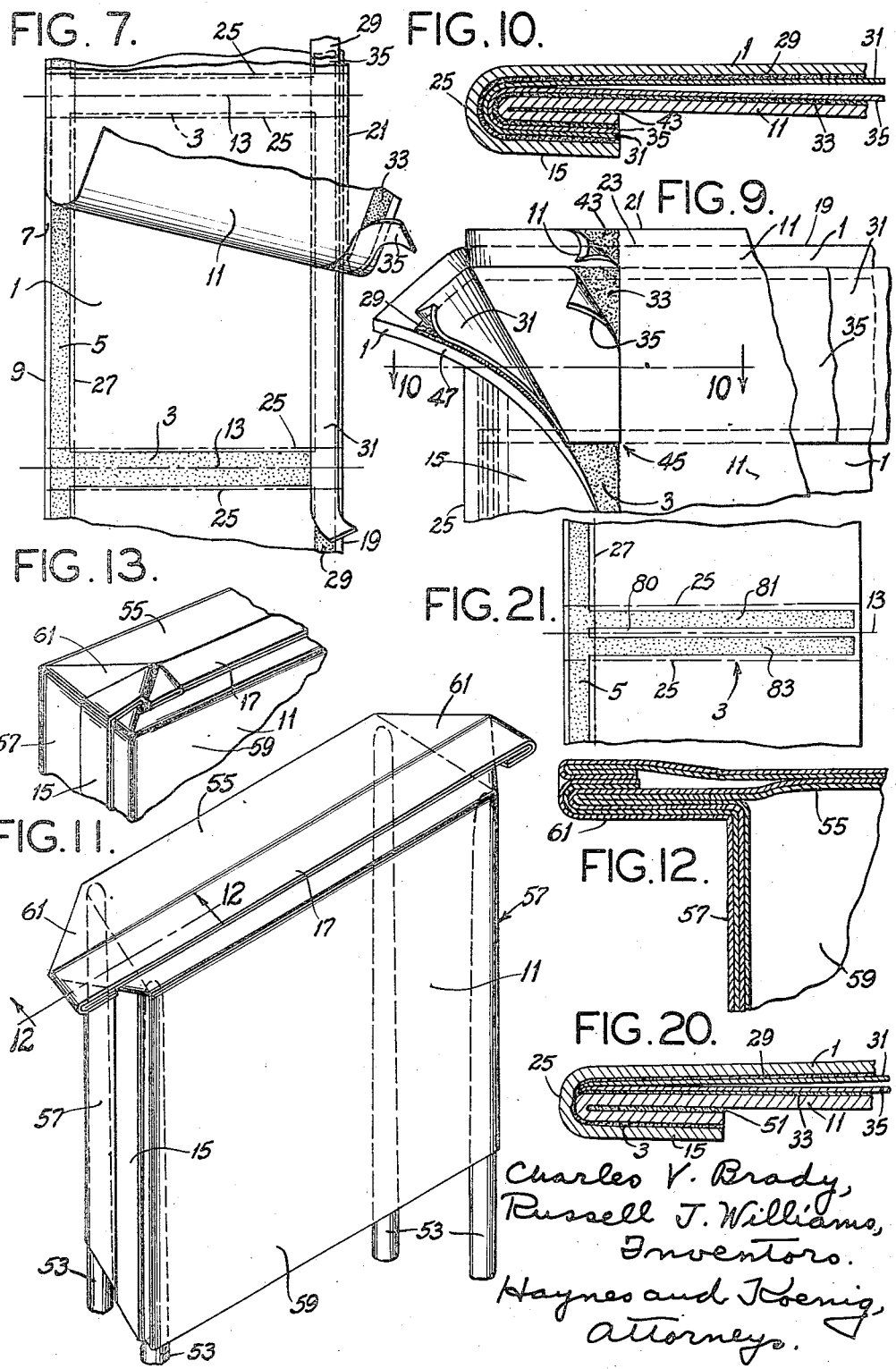

Oct. 8, 1946.   C. V. BRADY ET AL   2,409,100
BAG STRUCTURE AND PROCESS OF MANUFACTURE
Filed Nov. 1, 1943   3 Sheets-Sheet 3

Charles V. Brady,
Russell J. Williams,
Inventors.
Haynes and Koenig,
Attorneys.

Patented Oct. 8, 1946

2,409,100

UNITED STATES PATENT OFFICE 2,409,100

BAG STRUCTURE AND PROCESS OF MANUFACTURE

Charles V. Brady, Webster Groves, and Russell J. Williams, Richmond Heights, Mo., assignors to Bemis Bro. Bag Company, St. Louis, Mo., a corporation of Missouri Application November 1, 1943, Serial No. 508,534

6 Claims. (Cl. 93—35)

This invention relates to bag structures and their methods of manufacture, and with regard to certain more specific features to flat bag structures which may also be used as case or bag liners or the like.

Among the several objects of the invention may be noted the provision of a bag structure which lends itself to economical mass production methods; the provision of a bag structure of the class described which with only minor modifications in the manufacturing operation will form bags which are to be closed in the ordinary way or those which are to be pressure or heat sealed; and the provision of a bag structure of the class described adaptable to various bottom forms, such as satchel bottoms, V-bottoms and the like. Other objects will be in part obvious and in part pointed out hereinafter.

The invention accordingly comprises the elements and combinations of elements, steps and sequence of steps, features of construction and manipulation, and arrangement of parts which will be exemplified in the structures and methods hereinafter described, and the scope of the application of which will be indicated in the following claims.

In the accompanying drawings, in which are illustrated several of various possible embodiments of the invention, Fig. 1 is a fragmentary plan view of an intermediate composite web product with one web stripped back;

Fig. 2 is a view similar to Fig. 1 but showing a final bag-like article after segmentation of the intermediate product shown in Fig. 1;

Fig. 3 is a view similar to Fig. 2 showing a possible succeeding step;

Fig. 4 is a top edge view of Fig. 3;

Fig. 5 is a view similar to Fig. 2 showing an alternative product;

Fig. 6 is an enlarged vertical section taken on line 6—6 of Fig. 5;

Fig. 7 is a view similar to Fig. 1 but illustrating the intermediate product used to produce the construction of Figs. 5 and 6;

Fig. 8 is a view similar to Fig. 6 but showing a modification thereof;

Fig. 9 is a detailed view of a bag corner structure in which certain features of Figs. 3 and 5 are combined;

Fig. 10 is a horizontal section taken on line 10—10 of Fig. 9;

Fig. 11 is a perspective view showing how the products of our invention may be manipulated to form a bottom;

Fig. 12 is an enlarged section taken on line 12—12 of Fig. 11;

Fig. 13 shows certain bottom corner tabs produced in Fig. 11 bent upward against the bottom of the bag;

Fig. 20 is a view similar to Fig. 9 but showing a modified closure construction; and, Fig. 21 is a fragmentary view of a portion of Fig. 1 showing a modified construction.

Similar reference characters indicate corresponding parts throughout the several views of the drawings. All figures are diagrammatic, thicknesses of material being exaggerated for clarity.

Figure 14:
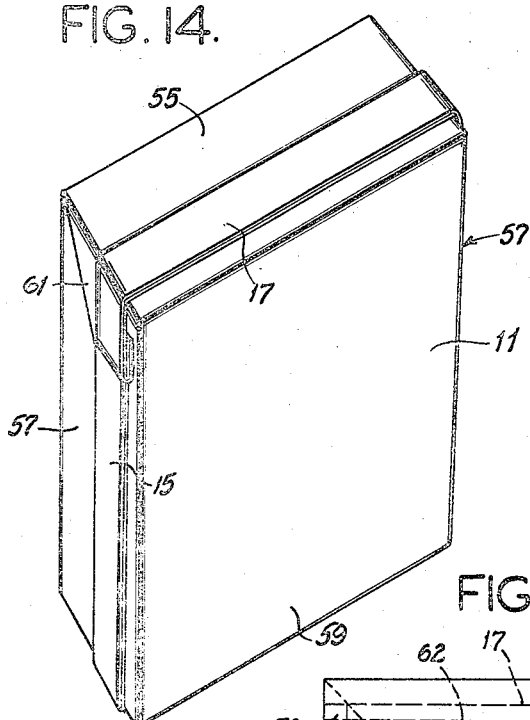
Fig. 14 is a view similar to Fig. 12 but showing said corner tabs bent down against gusset-forming portions of the bag.

In the copending United States patent application of Russell J. Williams, Serial No. 507,961, filed October 28, 1943, for Laminating apparatus, and eventuated as Patent No. 2,382,930, dated August 14, 1945, there is disclosed mechanical apparatus for manufacturing an intermediate laminated web product, the latter forming part of the subject matter of the invention herein.

Referring now more particularly to Fig. 1, there is shown at numeral 1 a web, preferably of paper, although it may be made of fabric or other similar bag-forming material. Imprinted on this web are spaced laterally located adhesive bars 3. These are joined at one side (which will become the bottom side of a bag) by a continuous bottom-forming stripe of adhesive 5. Stripe 5 is slightly spaced from the edge 9 of web 1 as indicated at 7.

Pressed against the web 1 is a second web of paper or the like 11, which adheres at the adhesive areas 3 and 5, thus forming a composite web having a sequence of U-shaped adhesive areas. These form pockets between the webs.

Next the composite web is cut at lines 13 which pass through the bars 3. If desired, an unpasted area 80 may be left in each bar 3 where the line of severance 13 is to come, such as indicated in the fragmentary view of Fig. 21. This, in effect, separates the composite bar 3 into two portions on each side of the line of severance 13.

The above results in the bag or bag-like pocket structure along the lines shown in Fig. 2, having pasted side seams 15 and a bottom seam 17. Fig. 2 is based upon the specific form of Fig. 1. Due to the relatively narrow width of the webs 1 and 11, this structure is more or less pillow-shaped, having side seams 15, a bottom seam 17 and an open mouth at the edge 19. By having provided an offset between the edges 19 and 21 of the webs 1 and 11 respectively, there is produced the offset indicated at 23 in Fig. 2. This offset allows the mouth of the bag to be opened more readily. One corner of the pillow-shaped bag of Fig. 2 is shown opened to indicate the structure.

It is to be understood that the webs 1 and 11 during manufacture of the composite webbing shown in Fig. 1 are withdrawn from rolls and brought together continuously as indicated for example in said patent application above-mentioned. Each web may be single-ply or multi-ply, treated or untreated.

The adhesive may be any of various types, depending upon the service to which the bag is to be put, for example, asphalt which remains flexible and tacky, dextrine, other thermo-plastics, or the like. As will be shown, pressure or heat sealing adhesives are preferable in certain instances.

It is intended that the pillow-shaped bag, pocket, or case liner indicated in Fig. 2 be used per se in certain instances, but usually it will be desirable to increase seam strength. For this purpose score lines 25 are provided within the side seams 15 and score line 27 within the bottom seam 17. The scoring is preferably done on the composite web as indicated at the top of Fig. 1 after the two webs 1 and 11 have been brought together but before they are segmented along the lines 13. This may be done as indicated in said patent application. Or, scoring may be done after segmentation but it is not as economical. The seams 15 are turned on the score line 25 toward the body of the bag, and seam 17 is then turned up toward said body and over the side seam ends. Adhesive may be inserted between the folded-over seam portions 15 and 17 on the one hand and the adjacent bag wall on the other hand, thereby maintaining the folded relationship shown in Figs. 3 and 4. Thus increased seam strength is obtained. In addition, contact is inhibited between the material carried in the bags and the adhesive in the seams. Adhesive is not necessary to maintain the folded relationship when the envelope of Figs. 3 and 4 is used as a liner in an outside covering bag or envelope.

It is intended that the open mouth of the bag in Figs. 2, 3 and 4 be closed in the ordinary way after the bags are filled.

In Figs. 5–8 a modification is shown. In these figures numerals that correspond to the elements above-mentioned are the same. But in this case an added stripe of adhesive 29 is provided near the edge 19 of web 1, and before application of web 11 is covered with a protective tape 31 (Fig. 7). Then, before bringing the web 11 against the web 1, said web 11 is also provided with a stripe of adhesive 33 and covered with a tape 35. Stripes 29, 33 and tapes 31 and 35 become coplanar or opposite. Hence, when the webs are organized so as to adhere them at the adhesive regions 3 and 5, the stripes 29 and 33 are prevented by the tapes 31 and 35, respectively, from adhering. The tapes 31 and 35 are segmented along with the segmentation of the webs 1 and 11, as indicated in Fig. 5. The result is a bag structure in which the side seams 15 and 17 function as before but within the open mouth are two stripes 29 and 33 of adhesive which are protectively covered by the segments of the tapes 31 and 35 respectively. This condition is indicated in Fig. 6.

Thus the bag may be filled without damaging or interference from the adhesive under the tape. Thereafter the tape may be ripped out manually, it being understood that the adhesive (for example, asphalt) will remain tacky enough to permit this. Then the opposite sides of the bag mouth are pressed together and the tacky or pressure-sensitive adhesive will cause the stripes 29 and 33 to adhere, thus closing the mouth of the bag by mere pressure after filling.

It will be noted that the ends of the tapes 31 and 35 may be gotten hold of at the open bag corners because these corners are also protected against adhesion during the time that the tapes are in place. Thereafter, the corners, like the remainder of the striped portions 29 and 33 will adhere by pressure, thus completing the desired peripheral seal.

In Fig. 8 is shown a modification in which, instead of providing the offset 23 between the edges 21 and 19 of the web, as indicated in Fig. 6, an offset 37 is provided between the edges 39 and 41 of tapes 35 and 31 respectively. Thus the bag mouth may be more readily opened preparatory to filling, while at the same time the extensions for providing the offset are handy in removing the tape preliminary to final closure.

In Figs. 9 and 10 is shown how the construction of Figs. 3 and 4 becomes modified when the tapes 31 and 35 are used. Fig. 9 shows a corner at one of the side seams 15, which are in this case presumed to be folded over according to the teaching of Figs. 3 and 4. After filling of the bag the corner portions 47 of the seams 15 may be laid back (the tackiness of the adhesive admitting this) so that the contained tapes 31 and 35 may be removed by ripping them out along with the removal of the remainder of them. Then by pressing back the mouth portions (including the corner portions) after removal of the tape, the mouth becomes sealed shut. As an alternative, the adhesive 43 which may be used between the folded-over seam and the adjacent bag wall may be stopped off at 45 to permit easier manipulation in withdrawing the tapes at the corners. It is to be understood that, when the adhesive 43 is not used within the folds 25 and 27, the product is used as a bag-like liner to be used in other bags or casings which hold the folds in place.

The tapes 31 and 35 may be omitted without omitting the stripes 29 and 33 of adhesive, if the adhesive is of the heat-sealing variety or, for example, dried glue which may be wetted prior to final bag closure after filling. Selection in this respect depends upon the character of the bag contents, strength of seams desired, and the like. The intent is to have a protected adhesive in the bag mouth or one which requires no protection during the bag filling operation.

Fig. 20 shows a different form of corner in which the side seams 15 are pasted down up to the mouth of the bag as indicated at 51. In this case the tapes 31 and 35, along with the adhesive stripes 29 and 33, are limited in length to lie only within the score lines 25. In this event the tape cannot be applied as indicated in Fig. 7, but is segmented beforehand and applied to the webs in the desired position between bars 3.

In Figs. 11-19 are shown various exemplary methods by means of which the bag forms shown in Figs. 3, 4, 9, 10 and 20 may be made up into V-bottom and satchel-bottom bags. The general method is that shown in the United States patent application of Russell J. Williams, Serial No. 489,933, filed June 7, 1943, for Methods of making bag bodies, and eventuated as Patent No. 2,381,850, dated August 7, 1945, but modified to suit the basic bag above described.

Figure 15:
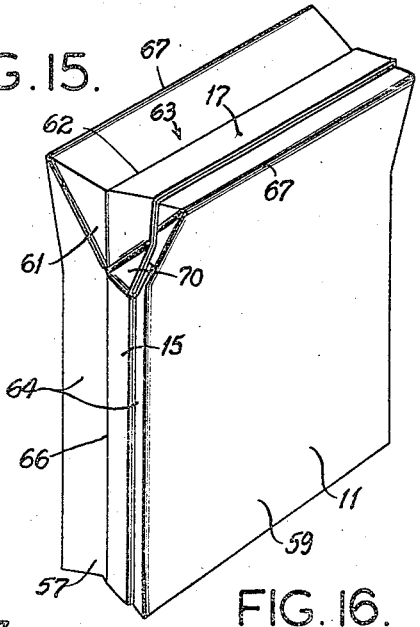
Fig. 15 is a view similar to Fig. 14 but showing a preliminary step in making gussets for a V-bottom bag.
Figure 16:
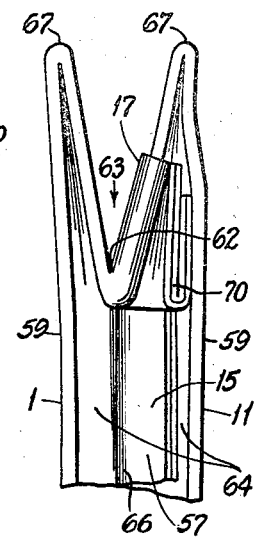
Fig. 16 is an enlarged edge view showing an almost completed V-bottom.
Figure 17:
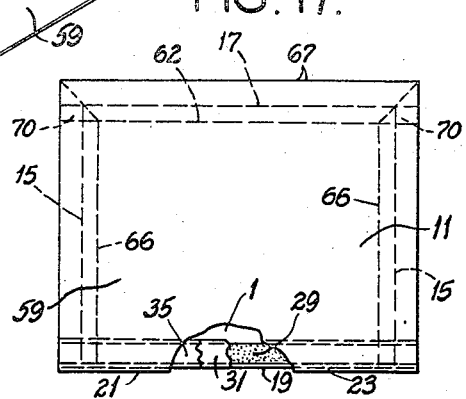
Fig. 17 is a face view (reduced in size) of a bag showing a finished bag employing said V-bottom.

Referring to Fig. 11, spreader sticks 53 are introduced into an inverted bag body and moved outwardly from one another so as to stretch the body into a parallelopiped. This temporarily forms a flat bottom 55, two flat sides 57 and flat walls 59. The result is that triangular-shaped ears 61 extend from the plane of the bottom 55. These are either turned up and against the bottom and adhered as shown in Fig. 13, or they are turned downwardly as shown in Fig. 14. Thereafter the bottom may be treated either as shown in Figs. 15-17 or as indicated in Figs. 18-19.

As an example of subsequent treatment the case will be taken of the ears bent down as in Fig. 14. Referring first to the form of Fig. 15, the V-bottom is shown. For making this, a crease 63 is applied which in effect gussets the bottom of the bag, which in these figures is shown upside down. Side gussets 64 are also formed. The crease 62 at the bottom of the gusset 63 and the crease 66 at the bottom of the gusset 64 are coplanar and these creases form the lines of support for the edge folded-over portions 17 and 15. When the bag is flattened out as shown in Figs. 16 and 17 the folded-over portions 15 and 17 are sandwiched in the gussets. It is to be noted that the small triangular portion 70 shown in Fig. 15, when the bag is flattened out as shown in Fig. 16, folds within the side gusset 64 as shown.

Figure 18:
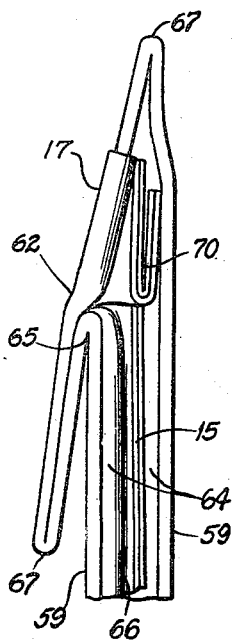
Fig. 18 is a view similar to Fig. 16 but showing a satchel bottom.
Figure 19:
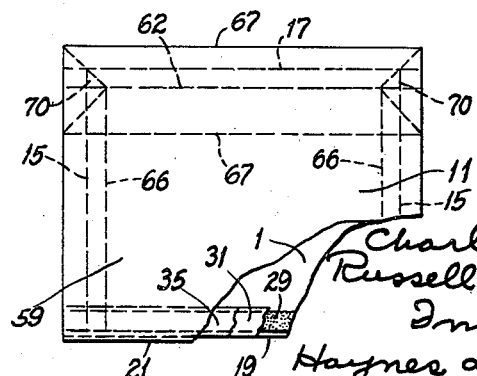
Fig. 19 is a view similar to Fig. 17 but showing a bag with the satchel bottom of Fig. 18.

If it is preferred to have the satchel-bottom type of bag, then the bottom, instead of being gusseted, is opened as shown in Figs. 18 and 19, a crease being inserted at 65, which permits laying the bottom out more or less flatly as shown in Figs. 18 and 19. It will be observed that edges 67 in the case of Figs. 18 and 19, instead of being together, as in Figs. 16 and 17, are separated, one of them lying against a side 59 of the bag. In the case of Figs. 18 and 19 the seams 15 are again sandwiched in the side gussets 64 but the seam 17 lies flat against the open part of the flat bottom as indicated. The V-bottom or satchel-bottom may be employed either with the tabs or ears 61 folded against the bottom or against the sides. If the tabs 61 are folded up as shown in Fig. 13 before proceeding through the steps of Figs. 16-19, then these tabs do not appear in the side gusset but in the V-bottom (in the case of Fig. 16) and on the flat satchel bottom (in the case of Fig. 18). This alternative development has not been shown in detail in the drawings because it is obvious from the above what differences would occur.

The terms bag, bag-like structure, case liner, envelope and pocket are to be taken as equivalents herein. So also are the terms scoring and creasing. The terms adhesive and paste are also equivalently used.

Reference under Rule 43 is made to applicants' copending application for Bag structures and process of manufacture, Serial No. 622,268, filed October 15, 1945, a division of the present application.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A bag comprising coextensive areas of material forming front and rear walls, adhesive stripes sandwiched between said areas of material adjacent to three edges to form side and bottom seams and providing an open mouth, adjacent tacky stripes of adhesive in said mouth and respectively attached to said front and rear walls, and cover tapes removably attached to the respective walls by said respective last-named stripes but being between themselves unattached, said side seams and bottom seams being folded over against wall portions of the bag and being secured in position against said wall portions, the folded side seams having end portions of said removable tapes passing therethrough.

2. A bag formed as a pocket having adhesive side and bottom seams joining front and back walls and having a mouth, tacky adhesive extending along the inside margins of said mouth from edge to edge, cover tapes which are themselves unattached covering the respective margins of tacky adhesive and extending from edge to edge, whereby the mouth has freely separable independent margins throughout its entire length extending from edge to edge and including end portions of the side seams, which margins may be conveniently drawn apart for removal of said tapes after filling of the bag and whereby the mouth may be entirely reclosed by means of said adhesive, including the previously separable portions at the ends of the side seams, each of said adhesive side seams being folded against one of said walls and secured in position against the respective wall.

3. A method of manufacturing bags comprising applying to a continuous web portion of material laterally located and longitudinally spaced bars of adhesive, applying longitudinal stripes joining the ends of said bars of adhesive and located near the edges of said web, applying a continuous tape over one of said stripes to cover the same, said last-named stripe being tacky to permit tape removal, applying an edgewise stripe of tacky adhesive to a second web portion of material, applying said second web portion to the first web portion so as to bring its stripe of tacky adhesive opposite said tape-covered stripe on the other web, locating a second covering of continuous removable tape between the last-named adhesive and the first-named tape, and segmenting both web portions and the tapes in the regions of said laterally located adhesive bars.

4. A method of manufacturing bags comprising applying to a continuous web portion of material laterally located and longitudinally spaced bars of adhesive, longitudinal stripes joining the ends of said bars of adhesive and located near the edges of said web, applying a continuous tape over one of said stripes to cover the same, said last-named stripe being tacky to permit tape removal, applying an edgewise stripe to a second web portion of material, applying said second web portion to the first web portion so as to bring its stripe of tacky adhesive opposite said tape-covered stripe on the other web, inserting a second covering of continuous tape between the last-named tacky adhesive and the first-named tape before the second web is applied, segmenting the composite web and tapes through the regions of said bars, and folding against some side of the web portions the material which is joined by adhesive not covered by tape.

5. A method of manufacturing bags comprising applying to a continuous web portion of material laterally directed and longitudinally spaced bars of adhesive, longitudinal stripes joining the ends of said bars of adhesive and located near the edges of said web portion, applying a continuous tape to one of said stripes to cover the same, said last-named stripe being tacky to permit tape removal, applying an edgewise stripe of tacky adhesive to a second web portion of material, applying said second web portion to the first web portion so as to bring its stripe of adhesive coplanar with said tape-covered stripe on the other web after inserting a second continuous removable covering of tape between the last-named adhesive and the first-named tape, said tapes having free outside edges which are offset, and segmenting the composite web and tapes through said paste bars.

6. A method of laminating webs to form bag-like structures comprising applying between the webs lateral spaced bars of adhesive and a longitudinal bottom-forming stripe joining the ends of said bars, applying opposite stripes of tacky adhesive near the opposite edges and on the respective webs and sandwiching a continuous pair of cover strips between said last-named adhesive stripes whereby said last-named stripes are located between the webs and separated from one another until the cover strips are removed, and segmenting the resulting composite web and strips along lines located in the region of and parallel to said bars.

CHARLES V. BRADY.
RUSSELL J. WILLIAMS.